March 13, 1945.   D. Z. ERLE   2,371,132
TORQUE LINK
Filed Aug. 19, 1943
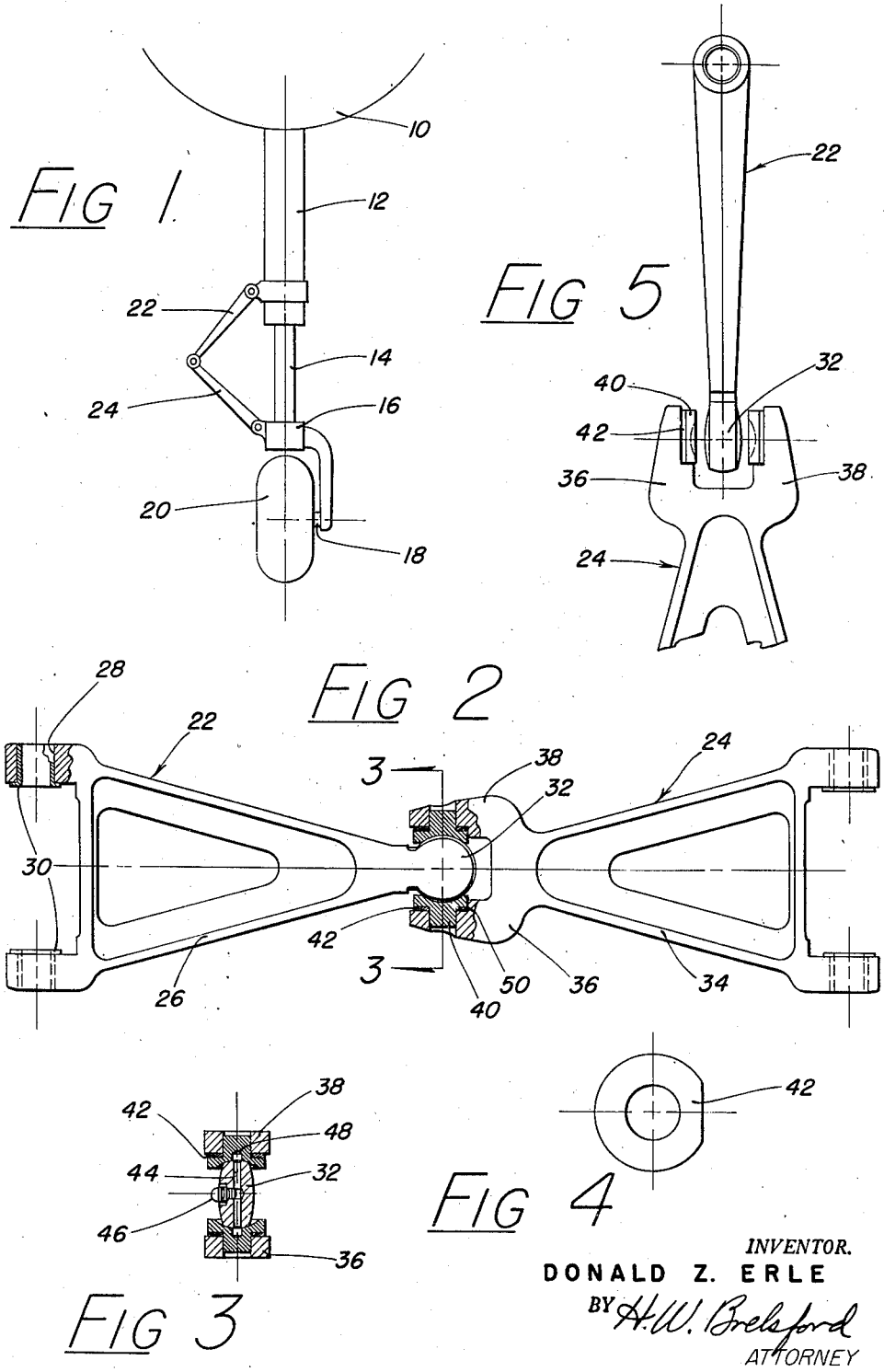
INVENTOR.
DONALD Z. ERLE
BY H. W. Brelsford
ATTORNEY Patented Mar. 13, 1945

2,371,132

UNITED STATES PATENT OFFICE 2,371,132

TORQUE LINK

Donald Z. Erle, North Hollywood, Calif., assignor, by mesne assignments, to Bendix Aviation Corporation, South Bend, Ind., a corporation of Delaware Application August 19, 1943, Serial No. 499,179

2 Claims. (Cl. 267—2)

This invention relates to landing gear for airplanes, and more particularly to improved torque links for maintaining the relative angular position of the telescoping cylinders of landing gear.

The most common type of airplane landing gear is the shock strut, having one end secured to the airplane and having a landing wheel secured to the other. The shock strut comprises an inner and an outer telescoping cylinder, and during the telescoping action oil is metered against the compression of air under pressure. In this way the shock of an airplane striking the ground is cushioned.

Since the wheel might swivel with relation to the airplane, torque links, or "scissors" are secured to the two telescoping cylinders, so that the two cylinders maintain a fixed angular position with respect to each other. In this manner the airplane wheel is held in any desired position, usually in the "straight forward" position.

Torque links are comprised of two members which are hinged together, the opposite ends of which are connected one to each cylinder. The hinge and the connections to the cylinders are pin joints. For this reason it has been necessary to observe extreme accuracy in machining to make the axes of the three pin joints exactly parallel. A further disadvantage of this customary structure is that when severe torsional loads were placed on the shock struts, as when the airplane wheels strike rough ground or the airplane is landed in a cross wind, the torque links elastically deform, pinching the middle pin and causing it to bind.

The present invention provides torque links wherein the connecting hinge joint is replaced by a ball and socket universal joint. This makes unnecessary the exact alignment of the main hinge joints with a connecting hinge joint, or with each other. Further, there is no tendency to bind under load.

It is therefore an object of the invention to provide ball and socket type torque links for shock struts.

It is another object of the invention to provide torque links for shock struts wherein accuracy of alignment of hinge joints is unnecessary.

A further object of the invention is to provide torque links which will be free from binding action under load.

Other objects and advantages of the invention will be apparent in the following description and claims, considered in connection with the accompanying drawing.

In the drawing forming a part of this specification:

Figure 1 is a view in full elevation of an airplane wheel and shock strut having a torque link made in accordance with the invention;

Figure 2 is a plan view of two torque links made in accordance with the invention;

Figure 3 is a view in full section taken along the line 3—3 of Figure 2;

Figure 4 is an elevation view of one of the adjustment shims used with the invention; and Figure 5 is a view on a reduced scale of the torque links of Figure 2, showing the method by which they are assembled.

Figure 1 shows a typical member of the main landing gear of an airplane. Secured to an airframe 10 is an outer shock strut cylinder 12 having a smaller cylinder 14 telescoping therein. Attached to the bottom of smaller cylinder 14 is an inverted L member 16 to which is secured a wheel axle 18. Hinged on outer cylinder 12 is a torque link 22 connected at its outer end to a torque link 24 hinged to L member 16. These two links 22 and 24 keep wheel 20 aligned with the airframe 10.

Referring to Figure 2, the torque link 22 has an A shaped frame 26 which is preferably made of forged steel. In each leg at the left is drilled a hole 28 into which is pressed a flanged insert 30 which is reamed to size. The right end of frame 26 is flat but has a rounded head 32 formed thereon having the edges made in a spherical shape so that the whole head 32 is a spherical segment.

The torque link 24 also has an A shaped frame 34 which has the usual holes and inserts in its legs on the right in Figure 2. Integrally formed on the left end of frame 34 is a yoke member having yoke arms 36 and 38. Yoke arms 36 and 38 are drilled, each hole retaining a bearing block 40 having a concave inner face cut in a spherical shape. The blocks are adjusted inwardly by shims 42.

Shown in Figure 3 is a section through the assembled socket joint of Figure 3. Spherical head segment 32 has a transverse hole 44 connected to a grease fitting 46. Bearing blocks 40 have a central hole 48 used as a lubricant retainer. A shim 42 is shown in Figure 4, and it will be noted that one side is flatted. This fits against shoulder 50 (Figure 2) and prevents rotation of the shim. Bearing blocks 40 are similarly flatted to prevent rotation.

The manner of assembly of the torque link is shown in Figure 5. The lower link 24 may be attached to its cylinder and then held outwardly of the strut. The upper link 22 is then grasped manually, before attachment of any kind, and the smaller dimension is inserted between yoke arms 36 and 38. The link 22 is then rotated 90 degrees from the position shown in Figure 5 until the two links become aligned in the same plane as in Figure 2. The spherical head 32 then engages the concave recesses in bearing blocks 40 to form a ball and socket joint. The joint is secure against rotations up to 10 degrees, and "hinge" action up to 200 degrees. If there is any slack in the joint or if it is too tight, the shims 42 may be adjusted accordingly. When the adjustments are completed the wide end of link 22 is pinned to its cylinder, completing the torque links.

Although the invention has been described with reference to a particular embodiment thereof, it is not limited to this embodiment, nor otherwise except by the terms of the following claims.

I claim:

1. Torque links for use on airplane shock struts comprising a triangularly shaped frame having a hinge structure on one base and a flatted spherical segment at the opposite apex, a second triangularly shaped frame having a hinge structure on one base and a yoke formed at the opposite apex, bearing blocks secured to the inner face of each yoke arm and having their opposite faces cut in a concave spherical shape of approximately the same radius as the spherical segment, the clearance between said bearing blocks being sufficient to permit the insertion of the flatted spherical segment so that it might be rotated to form a ball and socket joint, and a shim between said yoke and at least one of said bearing blocks, the thickness of said shim being variable to form an adjustment.

2. A torque link structure for use on shock struts comprising: a first frame having a hinge structure at one end and a socket member at the other end, said socket member consisting of a yoke having a pair of opposite internal spherically concave bearing areas, the centers of which are at opposite ends of a diameter that is parallel to the axis of said hinge structure; a second frame having a hinge structure at one end and a ball member at the other end, said ball member having a pair of opposite external spherically convex bearing areas, the centers of which are located at opposite ends of a diameter parallel to the axis of said hinge structure and spaced to fit snugly in ball and socket relation with said socket member when the axes of the hinges of the two frames are parallel, said ball member having a thickness perpendicular to the plane of its frame less than the minimum distance between the opposed concave faces of said yoke whereby said ball member is insertable into the socket member while one of said frames is rotated about its longitudinal axis approximately 90° from its normal position in which the axes of the hinges are parallel.

DONALD Z. ERLE.